(12) United States Patent
Zhang et al.

(10) Patent No.: US 8,485,668 B2
(45) Date of Patent: Jul. 16, 2013

(54) 3D INTERACTION FOR MOBILE DEVICE

(75) Inventors: Chunhui Zhang, Beijing (CN); Ji Zhao, Bejing (CN); Chunshui Zhao, Beijing (CN); Rui Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 187 days.

(21) Appl. No.: 12/790,315

(22) Filed: May 28, 2010

(65) Prior Publication Data
US 2011/0292347 A1 Dec. 1, 2011

(51) Int. Cl.
*G03B 21/26* (2006.01)
*G03B 21/14* (2006.01)
*H04N 5/74* (2006.01)

(52) U.S. Cl.
USPC ............. 353/28; 353/31; 353/69; 348/746; 348/747; 345/647; 382/275; 250/363.07

(58) Field of Classification Search
USPC ......... 353/28, 31, 69; 348/746, 747; 345/647; 359/202.1; 382/275; 356/608; 250/208.3, 250/334, 363.07
See application file for complete search history.

(56) References Cited

U.S. PATENT DOCUMENTS

| 6,198,462 | B1 | 3/2001 | Daily et al. |
| 6,606,091 | B2 | 8/2003 | Liang et al. |
| 7,397,464 | B1 | 7/2008 | Robbins et al. |
| 7,660,458 | B1* | 2/2010 | Saric ............................ 382/154 |
| 2005/0226505 | A1 | 10/2005 | Wilson |
| 2009/0016572 | A1* | 1/2009 | Hassebrook et al. ......... 382/106 |

OTHER PUBLICATIONS

Baekdal, "Microsoft Mobile Surface", retrieved on Apr. 16, 2010 at <<http://www.baekdal.com/future/interaction/microsoft-mobile-surface/>>, Baekdal.com, Mar. 2, 2010, pp. 1-4.
Butler, "Microsoft Research: D. Alex Butler—Recent Research Projects", retrieved on Apr. 16, 2010 at <<http://research.microsoft.com/en-us/um/people/dab/>>, Microsoft Corporation, 2009, pp. 1-8.
Capin, Haro, Setlur, Wilkinson, "Camera-Based Virtual Environment Interaction on Mobile Devices", retrieved on Apr. 16, 2010 at <<http://research.nokia.com/files/Mobile-Interaction-CameraReady.pdf>>, Lecture Notes in Computer Science, vol. 4263, Oct. 2006, pp. 765-773.
Hachet, Pouderoux, Guitton, "A Camera-Based Interface for Interaction with Mobile Handheld Computers", retrieved on Apr. 16, 2010 at <<http://iparla.labri.fr/publications/2005/HPG05/hachet_i3d.pdf>>, ACM, Proceedings of Symposium on Interactive 3D Graphics and Games, 2005, pp. 65-72.
Kulkarni, "LG Sphere, a Phone Based on 3D Interaction 3D Touch Interface", retrieved on Apr. 16, 2010 at <<http://hotcellularphone.com/lg/lg-sphere-phone-based-3d-interaction-3d-touch-interface/>>, Cell Phone News and Cell Phone Reviews: HotCellularPhone.com, Jan. 2, 2010, pp. 1-2.

(Continued)

*Primary Examiner* — Tony Ko
*Assistant Examiner* — Magda Cruz
(74) *Attorney, Agent, or Firm* — Shook Hardy & Bacon LLP

(57) ABSTRACT

Techniques for utilizing an infrared illuminator, an infrared camera, and a projector to create a virtual 3D model of a real 3D object in real time for users' interaction with the real 3D object.

20 Claims, 17 Drawing Sheets

OTHER PUBLICATIONS

Steinicke, Hinrichs, Schoning, Kruger, "Multi-Touching 3D Data: Towards Direct Interaction in Stereoscopic Display Environments coupled with Mobile Devices", retrieved on Apr. 16, 2010 at <<http://ifgiweb.uni-muensterdef~j_scho09/pubs/MultiTouching3DData.pdf>>, Advanced Visual Interfaces Workshop (AVI), May 2008, pp. 46-49.

Watanabe, Cassinelli, Komuro, Ishikawa, "The DeformableWorkspace: a Membrane between Real and Virtual Space", retrieved on Apr. 16, 2010 at <<http://www.k2.t.u-tokyo.ac.jp/members/watanabe/watanabe_tabletop08.pdf>>, IEEE International Workshop on Horizontal Interactive Human Computer System (TABLETOP), 2008, pp. 155-162.

* cited by examiner

3D INTERACTION FOR MOBILE DEVICE

BACKGROUND

Hand-held mobile devices such as mobile phones have become small and powerful, and they continue to develop at a rapid pace. However, limited method of interaction are still challenging to users. Users desire larger displays and natural interaction experiences, such as interaction with real 3D objects and display of 3D images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

The Detailed Description describes a mobile device that uses a projector to illuminate a projection area external to the mobile device as a "touch-sensitive" screen, and uses an infrared illuminator and an infrared camera to create a virtual 3D model of a real 3D object placed on the projection area in real time for users' interaction with the real 3D object. In addition, the mobile device can create a 2D or 3D display, including internal layers of a real 3D object such as a building, corresponding to user's interaction with the virtual 3D model.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure describes techniques for using a projector to project or illuminate a projection area external to the mobile device and to use the projection area as a display and touch-sensitive user interface. The disclosure also describes techniques for using one or more sensing mechanisms, such as an infrared illuminator and/or camera, to determine the 3D shape of a real object placed on the projection area, and to detect a user's 3D interaction with the object. In some embodiments, the camera captures images of individual scan lines projected on the projection area and object, and analyzes the images of the scan lines to determine the shape of the object. This can be performed in almost real-time, in a process that is invisible to the user.

In certain usage scenarios, captured 3D information can be used to display augmented information about the object, such as internal structure, multi-level views, views from different viewpoints, descriptive annotations or tags, additional graphics, etc. For example, the system can display a map of the location of a building, and additionally display internal structure of the building as the user moves a retro-reflector card above the projected image. This and other examples will be described in more detail below.

General Architecture

Figure 1:
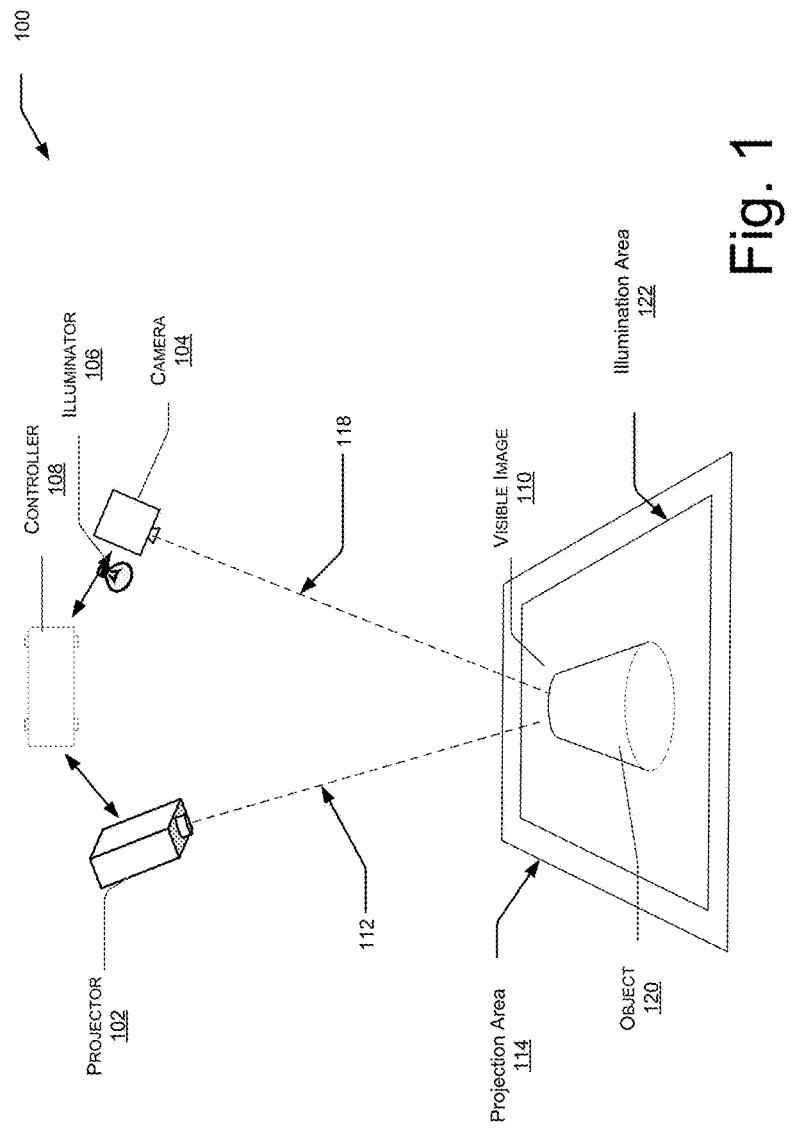
FIG. 1 shows an exemplary system 100 to obtain and display 3D information.

FIG. 1 shows an exemplary system 100 to obtain and display 3D information. The exemplary system comprises a projector 102, a camera 104, an illuminator 106, and a controller 108. Projector 102, camera 104, illuminator 106, and controller 108 can be separate components as shown in FIG. 1, or integrated within a dock station or mobile device as described later.

Projector 102 is configured to project a visible image 110 from or along a first perspective 112 toward a projection area 114, such as a desk or table surface. Projector 102 is a line or raster scanning projector, which constructs a 2-D image by sequentially scanning or tracing a sequence of adjacent raster lines onto projection area 114. The lines are traced and retraced at a high rate so that individual lines are not perceptible to a human viewer; rather, a human viewer perceives a continuous 2-D image formed by the multiple adjacent lines of illumination. Projector 102 can be an optical or laser projector. In the example described herein, projector 102 is a laser projector that creates a scanning beam containing both visible and infrared light. Projector 102 can take many forms, including that of a so-called "pico" projector, which is small in size and has modest power requirements.

Camera 104 is configured to aim at projection area 114 from or along a second perspective 118 other than the first perspective 112. Camera 104 is also, or alternatively, capable of capturing non-visible light such as infrared light projected by projector 102 and incident on projection area 114. Camera 104 is sufficiently sensitive and has a sufficiently rapid shutter speed to capture an individual image of each raster line projected by projector 102. Camera 104 is configured to collaborate with projector 102 to scan object 120 at a fast rate, with each image being timed relative to the projector to capture a single raster line. For example, a 640×480 pixel image from projector 102 comprises 480 individual raster lines. If these lines are scanned at a rate of once per second, the camera is configured to capture 480 images per second, with each image corresponding to an individual one of the 480 rows of the image.

In an example, projector 102, which is a laser projector, scans a color laser beam across projection area 114 line by line, which works like a raster of CRT monitor. Projector 102 will output a vertical synchronization signal, which indicates the time the projector starts to scan a new frame. Assuming that a first scanning line start at T0, a last scan line finishes at T1, and there are N scanning lines in one frame, then a start time and an end time of any scanning line can be calculated. Camera 104 starts exposure at a beginning of one scanning line and stops exposure at an end. An image of such scan line is thus obtained.

Controller 108 comprises a computing device and/or other operational logic connected to control projector 102 and camera 104, and to receive data from camera 104. As will be described in more detail below, controller 108 is configured in conjunction with projector 102 and camera 104 to determine the shape of an object 120 in projection area 114. This process involves capturing raster line images with camera 104 of individual raster lines as they are projected by projector 102 onto object 120, and evaluating distortion of individual raster lines of each raster lime image. Further details are described in FIG. 2 and FIG. 3 below.

Illuminator 106 is positioned concentrically with camera 104 to illuminate an illumination area 122 within projection area 114 with non-visible lights as shown in FIG. 1. In some other embodiments, illuminator 106 can also be positioned in other places. Illumination area 122 is configured to cover at least an area where object 120 is placed within projection area 114, or an area equal to projection area 114, by coordination of controller 108. In this example, illumination area 122 is within projection area 114. Visible image 110 occupies a portion or all of illumination area 122 that is illuminated by illuminator 106.

Figure 2:
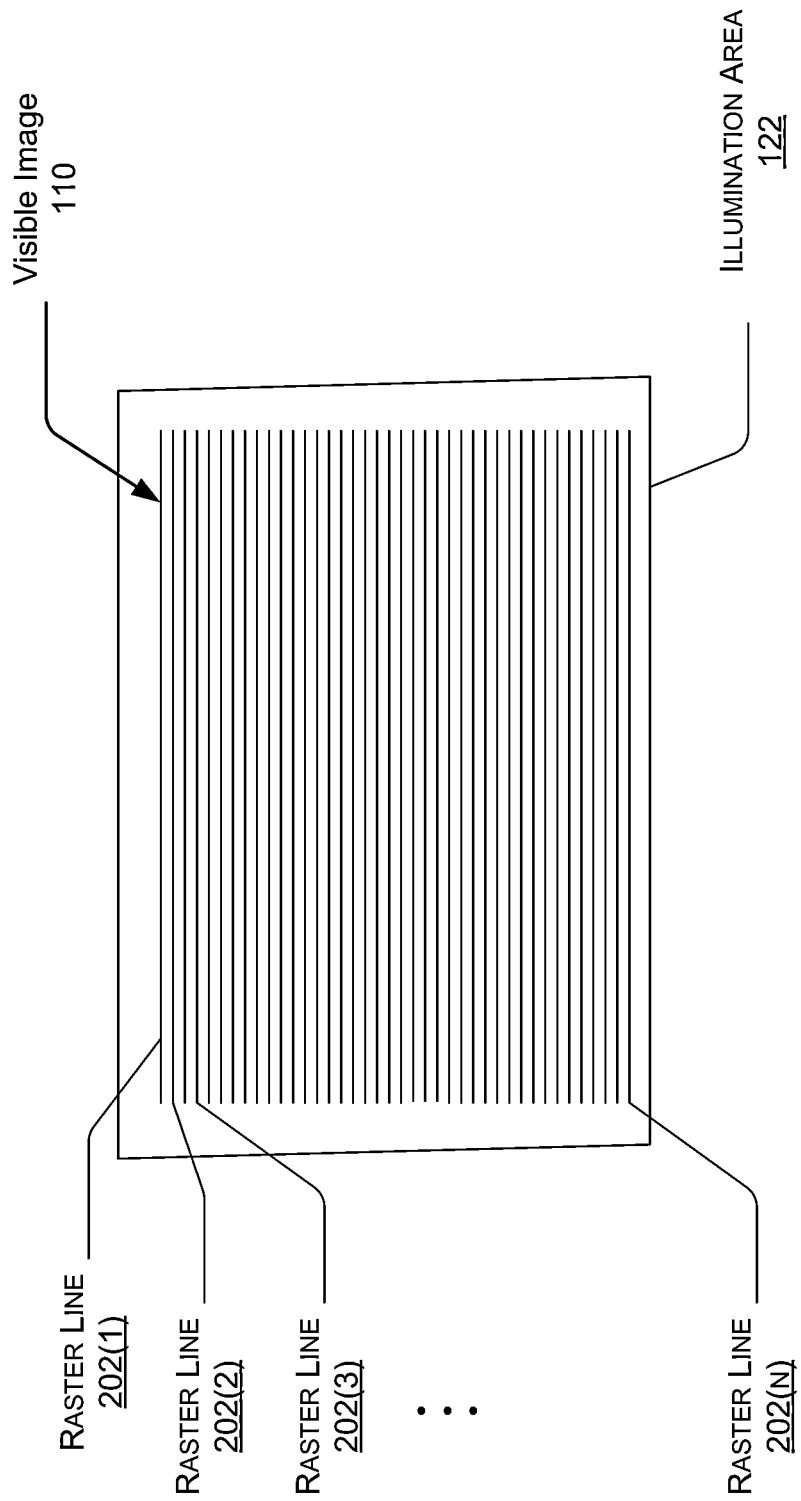
FIG. 2 shows an exemplary scanned sequence of raster lines generated by projector to form a visible image.

FIG. 2 shows an exemplary scanned sequence of raster lines generated by projector 102 to form visible image 110. In the example of FIG. 2, projector 102 is a laser projector and quickly scans illumination area 122. Each scan is a raster line projected by projector 102, such as a raster line 202(1), raster line 202(2), . . . , and raster 202(n). When the raster lines are traced and retraced at low rate, they are visible to the human viewer and thus visible image 110 shows sequences of raster lines as a traditional CRT display. The scanning speed of projector 102 at a sufficiently high rate such that human viewer cannot visually identify each raster line by eye and thus visible image 110 is observed without any visible beams. In practice, a high scanning rate of 60 fps is used to give the user a perception of a continuously displayed 2D image.

Figure 3:
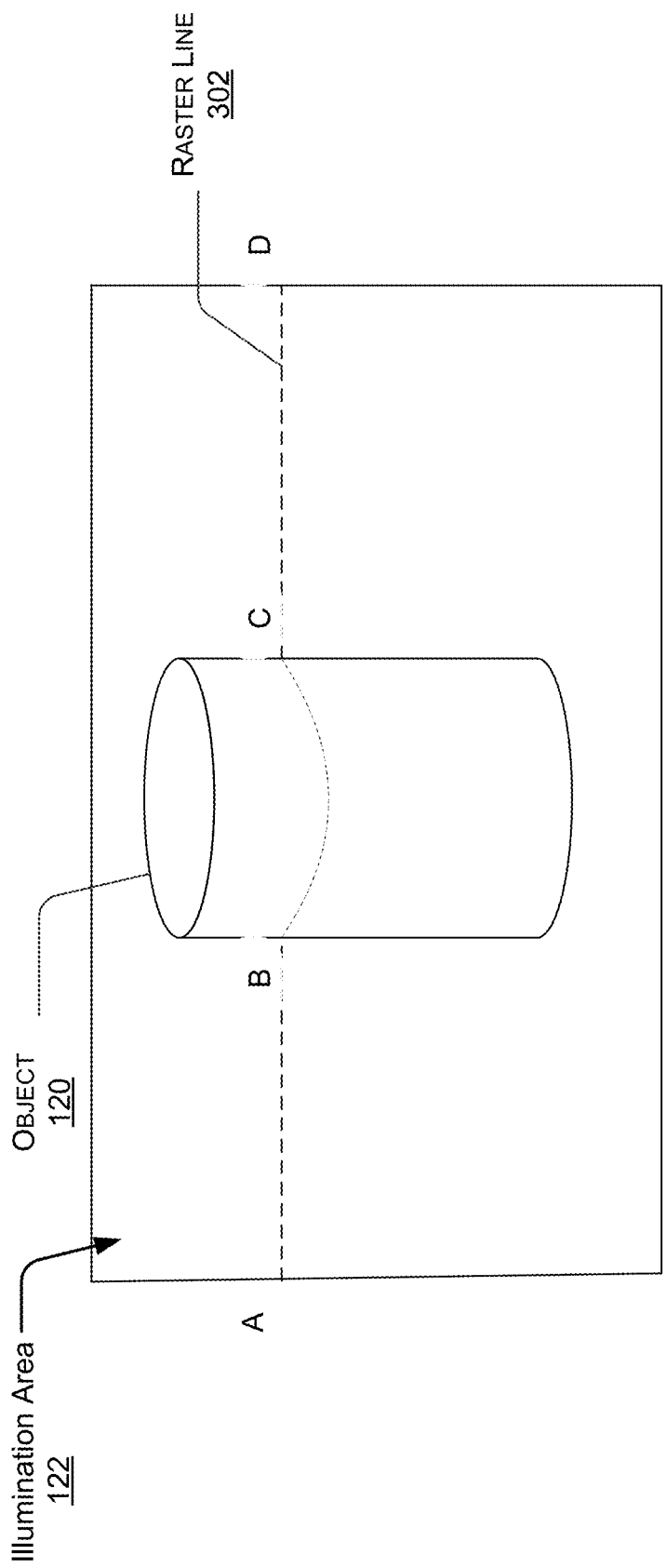
FIG. 3 shows a single projected raster line projected from the perspective of projector but viewed from the perspective of camera.

FIG. 3 shows a single projected raster line 302 projected from the perspective of projector 102 but viewed from the perspective of camera 104. As shown, height or z-axis variations created by object 120 distort raster line 302 from what would otherwise be a straight line. In this example, the distorted raster line 302, represented by line ABCD, is how the raster line appears from the perspective of camera 104. Because object 120 is a 3D object having variable height, raster line 302 is distorted according to height or shape of object 120 between two points C and D of object 120, in this case illustrating a curve CD along the curved or circular outer edge of object 120.

Figure 4:
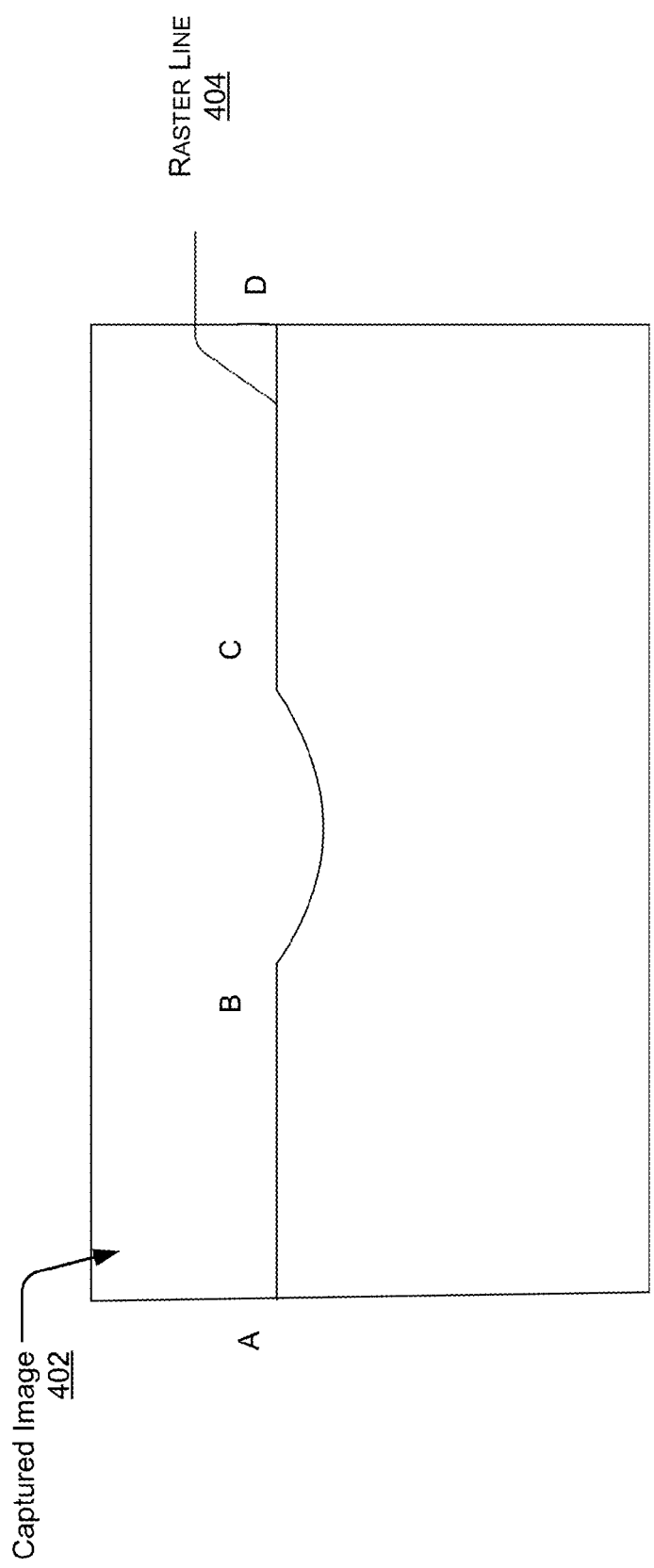
FIG. 4 shows an example of an image captured by camera during projection of raster line on object.

FIG. 4 shows an example of an image 402 captured by camera 104 during projection of a single raster line 302 on object 120. Camera 104 captures a 2D image, comprising a grid or array of individual pixels. Certain pixels will be brighter than others, corresponding to the line illuminated by projector 102. These pixels are illustrated by line 404 in FIG. 4.

Capturing the illumination resulting from a single scan of projector 102 is made possible by coordination between projector 102 and camera 104. When projector 102 starts to scan a raster line, controller logic 108 coordinates with camera 104 to capture that individual raster line as it is projected by projector 102 on illumination area 122. For example, controller 108 controls camera 104 to open its shutter or begin an image capture when projector 102 starts to scan a line, and to close the shutter or stop the image capture when projector 102 finishes scanning the line. In this manner, camera 104 captures line 404, corresponding to raster line 302, represented by points ABCD. Controller 108 further interacts with projector 102 and camera 104 to capture individual images corresponding to each individual raster line created by projector 102, across the area of illumination area 122.

Controller 108 is further configured to evaluate the distortion of each projected raster line, to infer the height or z dimension of object 120 at points along each raster line, and to thus create a 3D profile or contour of object 120.

Figure 5:
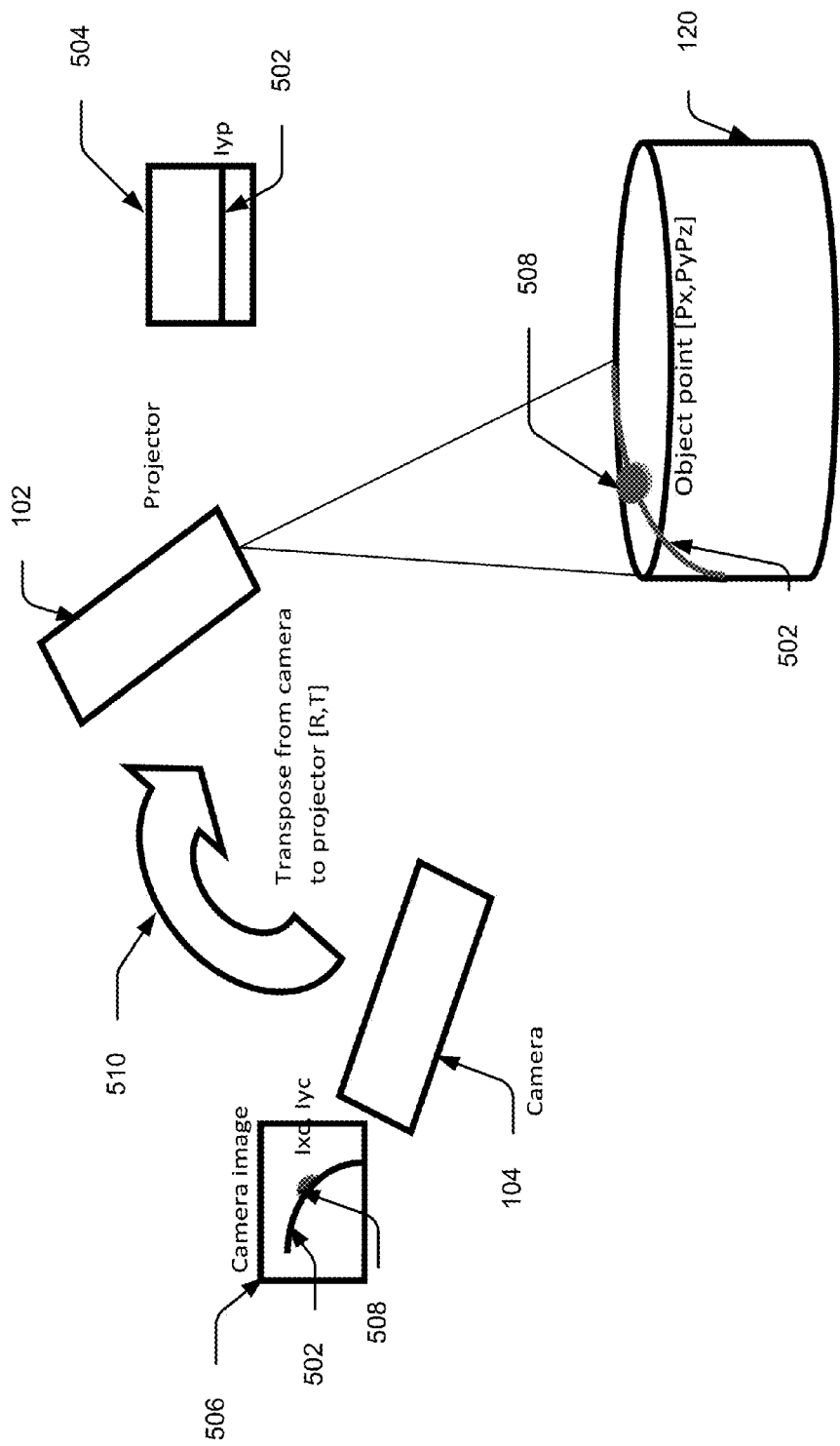
FIG. 5 illustrates principles involved in analyzing an image of a scan line to determine 3D characteristics of an object upon which the scan line is projected.

FIG. 5 illustrates the principles involved in analyzing an image of a scan line to determine 3D characteristics of an object upon which the scan line is projected. This analysis can be performed while a normal image is being projected, and is thus transparent to users.

FIG. 5 shows representations of projector 102, camera 104, and an object 120 whose shape is to be determined. As depicted, projector 102 projects a line 502 onto object 120. Line 502 is projected as a straight line, and appears straight from the perspective of projector 102. This is illustrated by frame 504, which shows line 502 as it might be viewed from the perspective of projector 102.

From the perspective of camera 104, however, line 502 appears curved. This is illustrated by a frame 506, which represents the image of line 502 captured by camera 104 from its perspective.

The following equations translate between a camera coordinate system c, and a projector coordinate system p. Subscripts c and p are used in conjunction with variables to designate the camera and projector coordinate systems, respectively.

In analyzing frame 506, the goal is to calculate a coordinate ($P_x$, $P_y$, $P_z$) of any given object point 508 on captured raster line 502. In the following equations, assuming a calibrated system, all parameters are known except for [$P_x$, $P_y$, $P_z$, $I_{xc}$, $I_{yc}$, $I_{xp}$, $I_{yp}$]. ($P_x$, $P_y$, $P_z$) represents coordinates of point 508 in the camera coordinate system. [$I_{xc}$, $I_{yc}$,] represents the coordinates of point 508 within frame 506. [$I_x$, $I_{yp}$] represent the coordinates of point 508 within the projector's projected frame 504. As long as either $I_{xp}$ or $I_{yp}$ is known, there will be three equations for ($P_x$, $P_y$, $P_z$) to obtain the coordinate ($P_x$, $P_y$, $P_z$) of projection point 508.

The following equation I expresses that when camera 104 captures point 508 on frame 506, a corresponding image point 508 represented by coordinate ($I_{xc}$, $I_{yc}$, 1) is obtained.

$$s_c * \begin{bmatrix} fc1_C & 1 & U_{0C} \\ 0 & fc2_C & V_{0C} \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} P_x \\ P_y \\ P_z \\ 1 \end{bmatrix} = \begin{bmatrix} I_{xc} \\ I_{yc} \\ 1 \end{bmatrix} \quad \text{Equation I}$$

In equation I, $S_c$ represents scale factor for equation I.

$fc1_c$ represents camera focal distance expressed in units of horizontal pixels;

$fc2_c$ represents camera focal distance expressed in units of vertical pixels;

$U_{OC}$ represents camera principal point axis X;

$V_{OC}$ represents camera principal point axis Y;

$P_x$ represents X coordinate of point 508 in camera's coordinate system;

$P_y$: represents Y coordinate of point 508 camera's coordinate system;

$P_z$ represents Z coordinate of point 508 in camera's coordinate system;

$I_{xc}$ represents X coordinate of point 508 in camera's coordinate system; and $I_{yc}$ represents Y coordinate of point 508 in camera's coordinate system.

The following equation II expresses that when projector 102 projects a 2D visible image or frame 504 and when projector projects or "observes" object point 508, a corresponding image point ($I_{xp}$, $I_{yp}$, 1) is obtained. In equation II, projector 102 can be regarded as a reversed camera 104. It is understood that camera 104 is an imaging device while projector 102 has the same lens structure but its light is reversed. To consider projector 102 as a reversed camera 104, projector 102 can be modeled by camera's 104 imaging model $$s_p * \begin{bmatrix} fc1_p & 1 & U_{0p} \\ 0 & fc2_p & V_{0p} \\ 0 & 0 & 1 \end{bmatrix} \begin{bmatrix} R_{11} & R_{12} & R_{13} & T_x \\ R_{21} & R_{22} & R_{23} & T_y \\ R_{31} & R_{32} & R_{33} & T_z \end{bmatrix} \begin{bmatrix} P_x \\ P_y \\ P_z \\ 1 \end{bmatrix} = \begin{bmatrix} I_{xp} \\ I_{yp} \\ 1 \end{bmatrix} \quad \text{Equation II}$$

In equation II, $S_p$ represents scale factor for equation II.

fc1p represents projector focal distance expressed in units of horizontal pixels;

fc2p represents projector focal distance expressed in units of vertical pixels;

$U_{Op}$ represents projector principal point axis X;

$V_{Op}$ projector principal point axis Y;

The matrix composed by [R, T] accomplishes an action 510, transposing ($P_x$, $P_y$, $P_z$) from the camera's coordinate system to the projector's coordinate system.

$P_x$ represents X coordinate of point 508 in camera's coordinate system;

$P_y$: represents Y coordinate of point 508 in camera's coordinate system;

$P_z$ represents Z coordinate of point 508 in camera's coordinate system;

$I_{xp}$ represents X coordinate of point 508 in projector's coordinate system; and $I_{yp}$ represents Y coordinate of point 508 in projector's coordinate system.

At this point, four equations are obtained as follows:

$f_1(P_x, P_y, P_z) = I_{xc}$ (Equation III)

$f_2(P_x, P_y, P_z) = I_{yc}$ (Equation IV)

$f_3(P_x, P_y, P_z) = I_{xp}$ (Equation V)

$f_4(P_x, P_y, P_z) = I_{yp}$ (Equation VI)

It is known from frame 504 that the line being considered has a certain Y position within frame 504. Thus, $I_{yp}$ is known.

Figure 6:
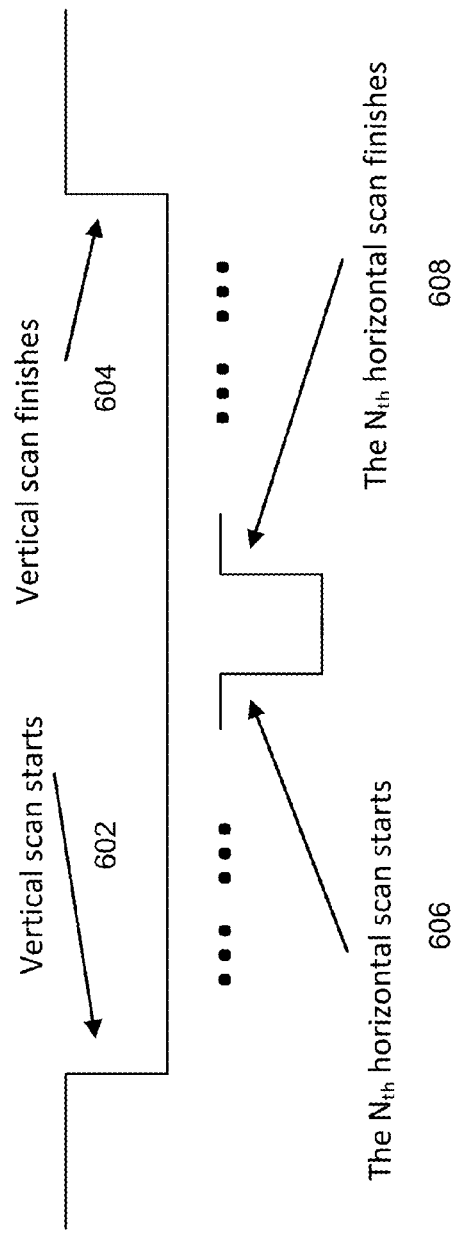
FIG. 6 shows a starting and ending of frame scanned by projector.
Figure 7:
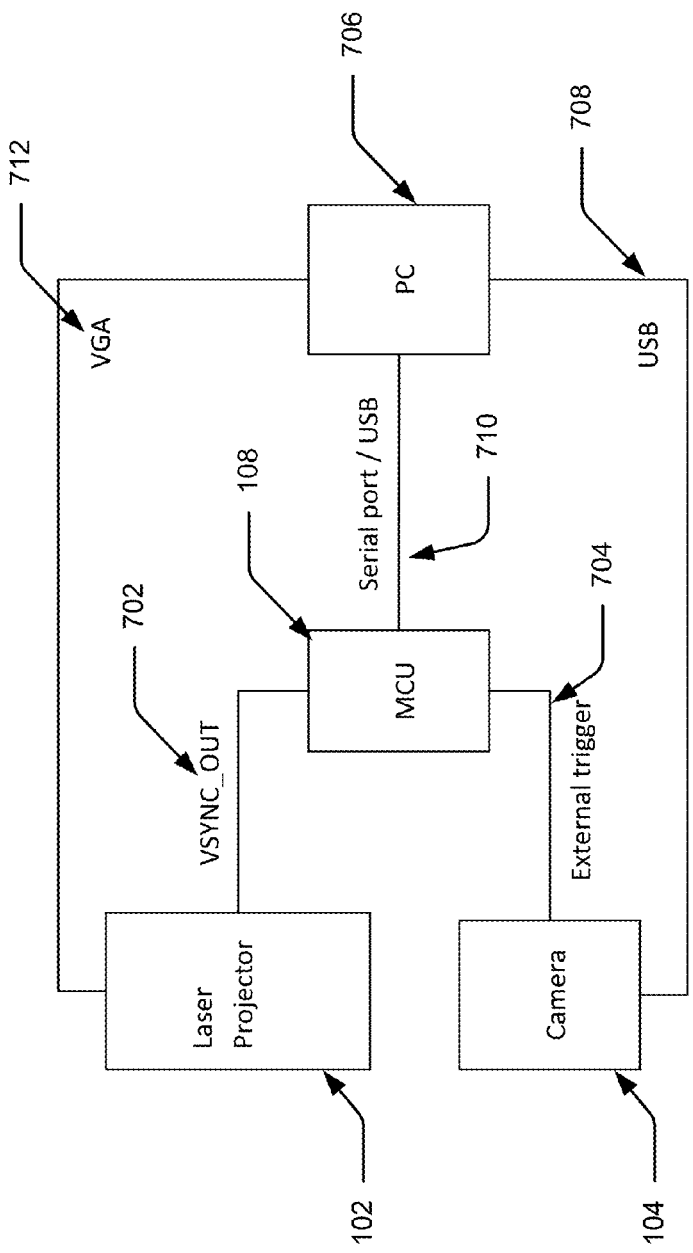
FIG. 7 shows an exemplary interconnection between projector, camera, controller, and other components.

This is illustrated by FIG. 6 and FIG. 7. FIG. 6 shows a starting and ending of frame 504 scanned by projector 102. Projector 102 provides vertical synchronization signal that indicates a start 602 and an end 604 of a frame and horizontal signal that indicates a start 605 and an end 608 for a Nth horizontal scan. For a 640*480 frame, there are 480 horizontal lines in each frame. Based on this, a start time and end time of each horizontal line can be calculated.

FIG. 7 shows an exemplary interconnection between projector, camera, controller, and other components. In FIG. 7, controller 108 is represented by an MCU and projector 102 is represented by a laser projector. The MCU is used to capture vertical synchronization signals 702 from projector 102 and calculate horizontal synchronization signals. MCU then uses horizontal synchronization signals to provide a trigger 704 to camera 104. At the same time, MCU can transfer the horizontal line number, i.e. $I_{yp}$, to PC 706 for further processing. In the example of FIG. 7, PC 706 connects with controller 108 by serial port or USB 710 and connects with camera 104 by USB 708. A VGA interface 712 is connected with projector 102 and PC 706 for display. In other embodiments, PC 706 can interconnect with projector 102, camera 104, and controller 108 by other means, including wireless communication.

Knowing $I_{yp}$, $I_{xc}$ and $I_{yc}$ can be obtained from frame 506. Equation $f_3$ ($P_x$, $P_y$, $P_z$)=$I_{xp}$ is ignored, as there are already three equations for three variables and a fourth equation is not necessary. The three left equations are as follows:

$f_1(P_x, P_y, P_z) = I_{xc}$ (Equation III)

$f_2(P_x, P_y, P_z) = I_{yc}$ (Equation IV)

$f_4(P_x, P_y, P_z) = I_{yp}$ (Equation VI)

With three equations and three unknown variables, it is possible to solve for the three variables, and coordinate ($P_x$, $P_y$, $P_z$) of projection point 508 can therefore be derived from these equations. Using the same technique, multiple points along line 502 are analyzed to find ($P_x$, $P_y$, $P_z$) for each of these points and to therefore construct a Z-axis profile of object 120 along line 502. The is repeated for multiple projection lines across object 120 to create a 2D mapping of Z-axis values over the area of object 120, resulting in a 3D profile.

Figure 8:
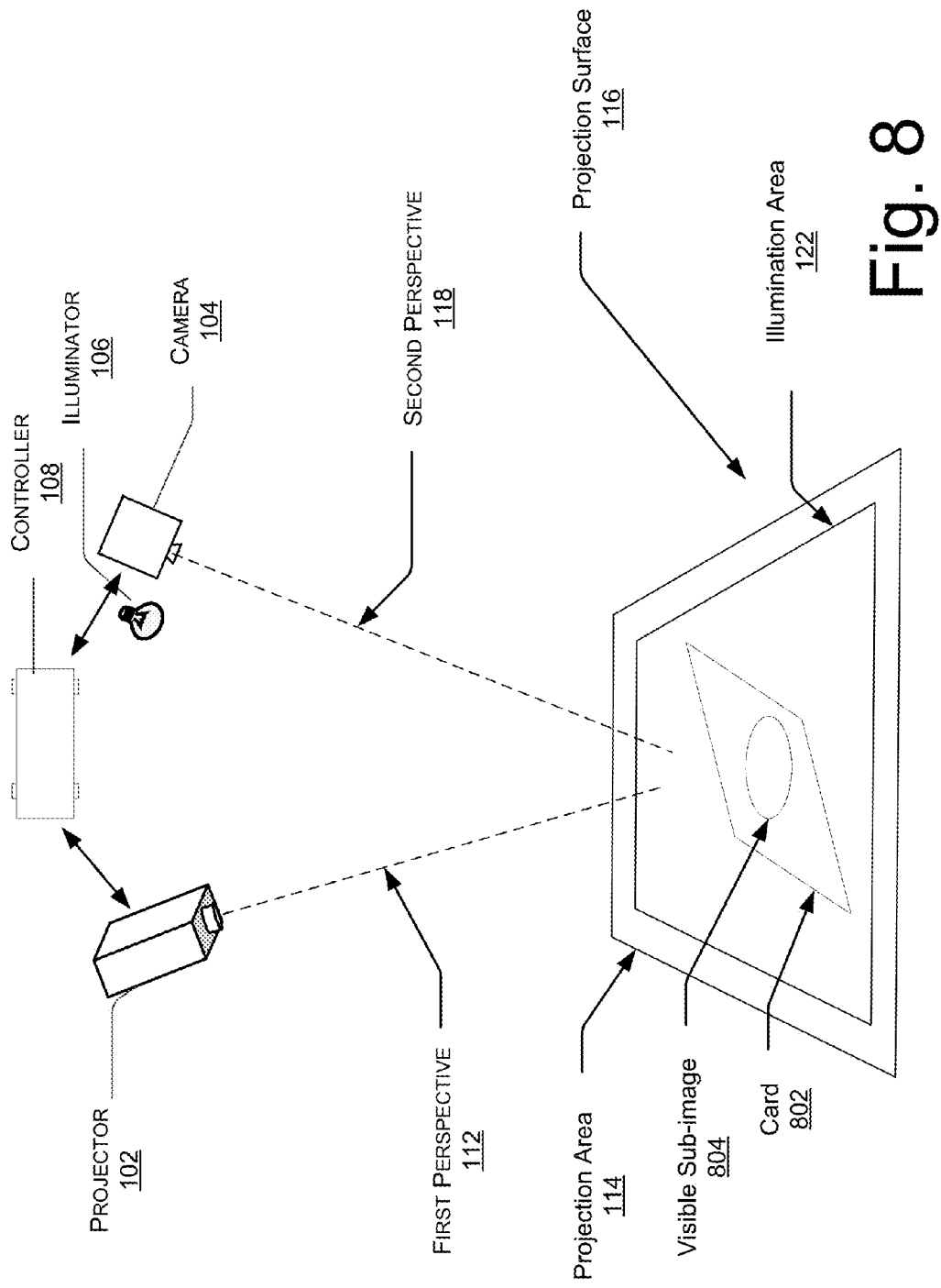
FIG. 8 shows an exemplary interaction with device by a hand-held card.

FIG. 8 illustrates that the described system can further be configured to create a "touch-sensitive" or "multi-touch" displayed user interface. This touch-sensitive user interface can capture the user's 3D input and the user's 3D interaction with visible image 110. For example, illuminator 106 illuminates illumination area 122 within projection area 114 with non-visible light. Projector 102 projects visible image 110 on illumination area 122. Controller 108 collaborates with camera 104, which can be tuned to be responsive only to infrared illumination, to capture area images of illumination area 122. The captured area images include both visible image 110 and user's movement of a finger or stylus relative to visible image 110 in space. Operation logic of controller 108 is further configured to analyze captured area images to determine physical user interaction with projected visible image 110. This allows system 100 to capture the user's 3D interaction with visible image 110. Both single-touch and multi-touch inputs can be detected.

The user can further hold a card, such as a retro-reflector card, within illumination area 122 to interact with system 100. FIG. 8 also shows an exemplary interaction with system 100 by a hand-held card 802. In this example, non-visible light, such as infrared light illuminated by illuminator 106, is used as a light source to avoid influence of visible light.

Illuminator 106 is positioned along with camera 104 to illuminate an illumination area 122 within projection area 114 with infrared light. Controller 108 is configured to collaborate with projector 102, illuminator 106, and camera 104 to capture an area image of non-visible illumination of projection area with camera 104. Controller 108 is also configured to analyze the captured area image to detect placement of user held-card 802 within projection area 114. Once the location of card 802 is known, a visible sub-image can be projected onto card 802 at its detected placement within projection area 114.

Card 802 need not to be placed in a fixed position. Rather, the user can move card 802 and change a pose and position of card 802 relative to projection area 114 as long as it is still within illumination area 122 and projection area 114.

Controller 108 can further collaborate with projector 102 to vary visible sub-image 804 such as its shape or content to correspond to movement of card 802 relative to projection area 114. Controller 108 is configured to continuously detect placement of card 802 within projection area 114 and to project a card image on card 802. Such card image includes object 120, not shown in FIG. 8, from perspective of card 802. For example, part of object 120 is shaded by card 802 and invisible to the user. Due to nature of infrared light, camera 104 is still capable to capture visible image 110 of object 120 as if it is not shaded by card 802. Projector 102 then projects an image of at least shaded portion of the projector's image onto card 802.

After an offline or preliminary calibration procedure, and knowing the size of card 802, the system can determine the 3D pose and position of card 802 relative to projector 102. This is accomplished by first determining the pose and position of card 802 within the coordinate system of camera 104, and then translating the resulting coordinates into the coordinate system of projector 102.

Determining the pose and position of card 802 relative to camera 104 is performed by detecting vertexes of the card and calculating 3D coordinates of those vertexes based on the known size and rectangular shape of the card. Conceptually, distance from camera 104 (and from projection area 114) is reflected in the lengths of the card edges defined by the vertexes. Angular orientation is similarly reflected by the angles of the card edges relative to each other. For example, the card edges will have 90 degree angles when the card is held directly facing the camera, but will vary from 90 degrees when the card is held at an angle to the camera. Using these assumptions, conventional matrix transformation techniques can be used to determine the 3D pose and orientation of card 802 relative to camera 104. Specific examples of such techniques are set forth below for informational purposes, although it should be understood that there may be a variety of ways to accomplish the same purposes.

Transforming between the coordinate system of camera 104 and the coordinate system of projector 102 can similarly be performed using conventional matrix transformation techniques, with a specific example being set forth below. Again, it should be understood that the described example is merely one way of doing this, and there may be a variety of ways to accomplish the same purpose. Also, note that calibration procedures may be used to determine appropriate transformation matrices. Calibration may depend on placement of both projector 102 and camera 104 relative to projection area 114.

By performing the analyses and transformations described above, the 3D pose and position of card 802 can be known within the coordinate system of projector 102. Based on this, controller 108 can create sub-image 804 to be projected within known projector coordinates of card 802. As the card moves, these calculations are repeated, and the projected sub-image is continuously varied. This creates an impression to a user that the card is acting as a window into a different dimension. For example, the user can move the card up and down to view physical/graphical details of a 3D object. As another example, the user can move the card horizontally over an image to view additional metadata regarding the portion of the image underlying the card.

As discussed above, an initial step in this process involves finding the coordinates of the four vertexes of card 802 relative to the camera coordinate system. This step, in turn, includes a pre-processing and edge detection, a vertex detection, and a pose and position calculations.

Figure 9:
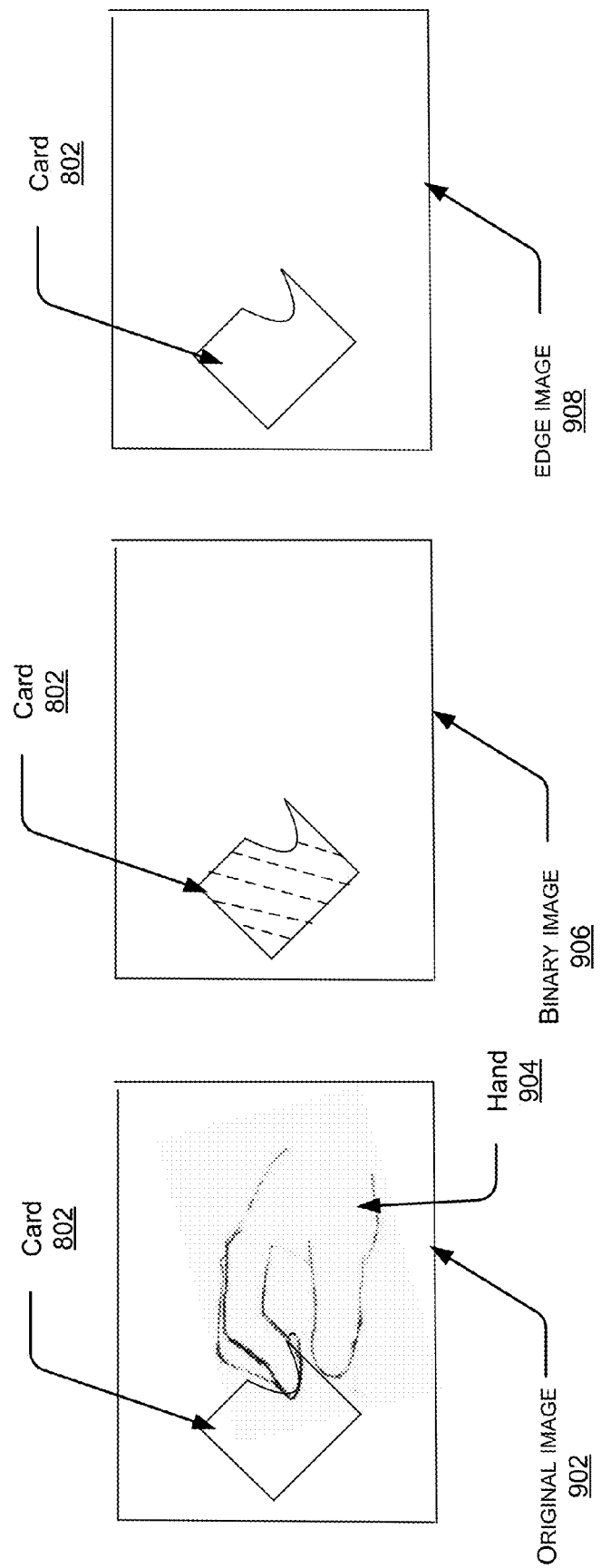
FIG. 9 illustrates a process of pre-processing and detecting edges of card.

FIG. 9 illustrates a process of pre-processing and detecting edges of card 802. Card 802 is illuminated by illuminator 106 and the resulting image is captured by camera 104 as an original image 902. As the user holds card 802, original image 902 shows both image of card 802 and the user's hand 904. A portion of card 802 is shaded by hand 904 in original image 902. Note that the actual image is captured in gray-scale, rather than as represented in FIG. 9.

A Gaussian filter is used to reduce random noise of original image 902 and a threshold algorithm is used to segment original image 902 into a binary (black and white) image 906. Only the relatively bright image of card 802 is highlighted and the image of the other portions including hand 904 are removed. The portion of card 802 that is shaded by hand 904 is also not shown in binary image 906.

An exemplary threshold algorithm is shown as Equation VII, below, wherein src(x,y) represents a gray value of pixel at x, y, dst(x, y) represents the corresponding pixel of binary image 906:

$$\begin{cases} \text{if } src(x, y) > \text{threshold}, dst(x, y) = 1 \\ \quad \text{otherwise}, dst(x, y) = 0 \end{cases} \qquad \text{VII}$$

An edge detection algorithm is used to further process binary image 906, resulting in an edge image 908. Edge image 908 is similar to binary image 906, except that instead of highlighting the entire card 802, it highlights only the edges of card 802: edge pixels are represented as white, while other pixels have values corresponding to black (or vice versa). Note that FIG. 9 shows the line edges as solid black lines for purposes of illustration.

Figure 10:
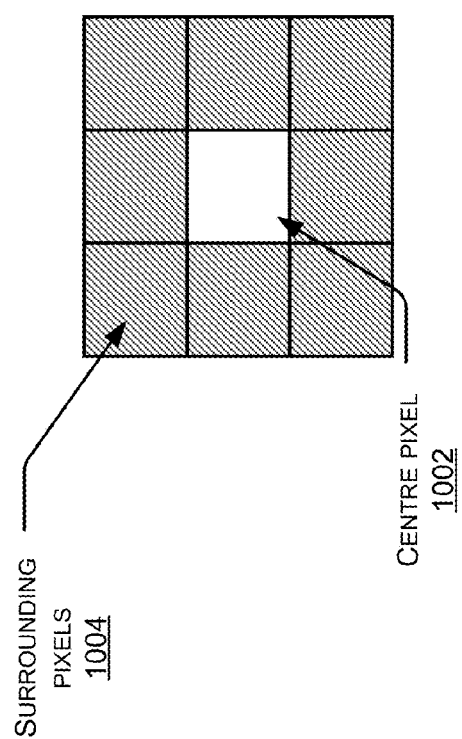
FIG. 10 illustrates one way in which edge pixels can be detected.

FIG. 10 illustrates one way in which edge pixels can be detected. An exemplary pixel 1002 of binary image 906 along with its surrounding pixels 1004. The edge detection algorithm checks the binary value of center pixel 1002 and the gradient between center pixel 1002 and surrounding pixels 1004. If center pixel 1002 is within the image area of card 802 and one of the surrounding pixels 1004 value is not within image area of card, center pixel 1002 is determined as an edge. More specifically, if center pixel 1002 is white and any of surrounding pixels 1004 are black, center pixel 1002 is declared to be an edge pixel.

The next step is to determine the four vertexes of card 802. In this step, the four vertexes of card 802 are calculated from edge image 908 using the Hough transform algorithm. In many cases, the Hough algorithm will detect more than four lines. A rectangle detection algorithm is then used to find the four lines that have the most possibility of forming a rectangle. Once such four lines are obtained, their points of intersection are calculated and declared to be the four vertexes of card 802. Finally, the vertexes are reordered to make sure they are sorted in clockwise order.

The next step is to calculate the 3D pose and position of card 802 relative to camera 104. This can be based on the calculated vertex coordinates and the known size of card 802. This calculated 3D pose and position is then transformed, using conventional techniques, into the coordinate system of projector 102. An example of these transformation techniques is described immediately below.

Three coordination systems are used in the following discussion, corresponding respectively to card 802, projector 102, and camera 104. A reference point of the camera coordinate system is set to the camera's optical center, which is the center point of camera's lens. A reference point of the projector's coordinate system is set to the projector's optical center. A reference point of the card's coordinate system is set to the card's center.

The card coordinate system is a 3D coordinate system based on the position and pose of card 802 in the real world. The projector/image coordinate system is a 2D system based on the 2D coordinates of image 110 as it is intended to be projected on a flat surface, in this case projection surface 116. The camera coordinate system is based on the pose and position of camera 104.

A 2D edge point of card 802 will be referred to within the projector/image coordinate system as $X_i$ and $Y_i$. The same edge point in the card (or marker) coordinate system is indicated as 3D coordinates $[X_m, Y_m, Z_m]$, and in the camera coordinate system as 3D coordinates $[X_c, Y_c, Z_c]$. A point such as this can be transformed from one coordinate system to another using conventional matrix calculation.

Equations for performing such transformations are shown as equations VIII and IX below. A transform matrix between the camera coordinate system and the card coordinate system is assumed, and is referred to herein as $T_{CM}$. Note that transform matrix $T_{CM}$ includes only 3D pose and transform information.

An estimation of $x_i$ and $y_i$ ($\hat{x}_i, \hat{y}_i$) by random initial value of $T_{CM}$ is computed. An optimization algorithm such as the Newton iteration method can then be used to get the estimation of $T_{CM}$ by minimizing the error function as shown in equation VIII.

The translation and rotation of card 802 in relation to camera 104 is obtained from $T_{CM}$ as shown in Equation VIII.

$$\begin{bmatrix} X_C \\ Y_C \\ Z_C \\ 1 \end{bmatrix} = T_{CM} \begin{bmatrix} X_M \\ Y_M \\ Z_M \\ 1 \end{bmatrix} = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix} \begin{bmatrix} X_M \\ Y_M \\ Z_M \\ 1 \end{bmatrix} \quad \text{Equation VIII}$$

Equation IX is a camera model which describes the relation between the projector coordinate system and the camera coordinate system. In Equation IX s, $f_x$, $f_y$, $x_c$, $y_c$ represent camera parameters that can be obtained from camera calibration, and h represents a scale factor.

$$\begin{bmatrix} hx_i \\ hy_i \\ h \end{bmatrix} = \begin{bmatrix} sf_x & 0 & x_c & 0 \\ 0 & sf_y & y_c & 0 \\ 0 & 0 & 1 & 0 \end{bmatrix} \begin{bmatrix} X_M \\ Y_M \\ Z_M \\ 1 \end{bmatrix} = C \begin{bmatrix} X_M \\ Y_M \\ Z_M \\ 1 \end{bmatrix} \quad \text{Equation IX}$$

In equation IX:
s represents a scale factor;
$f_x$ and $f_y$ represent focal distances expressed in units of horizontal and vertical pixels respectively; and $x_c$ and $y_c$ represent a position of a principal point on the imaging sensor.

Given estimation $\hat{T}_{CM}$ of $T_{CM}$, an estimation of $[x_i, y_i]$ can be obtained by Equation VII and indicated by $[\hat{x}_i, \hat{y}_i]$.

$$\begin{bmatrix} h\hat{x}_i \\ h\hat{y}_i \\ h \end{bmatrix} = C \cdot \hat{T}_{CM} \begin{bmatrix} X_m \\ Y_M \\ Z_M \\ 1 \end{bmatrix}, i = 1, 2, 3, 4 \quad \text{Equation X}$$

where f(e) is an error function between $[x_i, y_i]$ and $[\hat{x}_i, \hat{y}_i]$. With an optimization algorithm such as the Newton iteration method, an optimal estimation $\hat{T}_{CM}$ which minimized f(e) can be obtained.

$$f(e) = \sum_{i=1}^{4} \{(x_i - \hat{x}_i)^2 + (y_i - \hat{y}_i)^2\} \quad \text{Equation XI}$$

The above calculations rely on a previous offline calibration using card 802. The calibration procedure calculates the perspective matrix of camera and projector and the transformation matrix between camera and projector.

The calibration step measures the intrinsic and distortion parameters of camera 104 and projector 102 and the transform matrix (pose & position) between projector 102 and camera 104. This step also calculates the transform matrix between camera 104 and the projector 102 plane. When pose and position of card 802 relative to camera 102 are obtained, computation of visible sub-image 804 and its pose and position relative to projector can be performed.

There are many existing calibration algorithms. One example is a calibration algorithm disclosed in Z. Zhang, A flexible new technique for camera calibration, IEEE Transactions on Pattern Analysis and Machine Intelligence, 22(11): 1330-1334, 2000, and Z. Zhang. Flexible Camera Calibration By Viewing a Plane From Unknown Orientations, International Conference on Computer Vision (ICCV'99), Corfu, Greece, pages 666-673, September 1999.

Because projector 102 is a reversed camera, projector 102 is calibrated in a same manner as camera 104. However, since projector 102 cannot capture an image directly, a user is instructed to can manually driver a cursor to four different points for each calibration board image taken by camera 104. This can transform a camera image into a projector image, as if projector 102 had taken the image.

With the camera's intrinsic parameter, the 3D rotation and translation of card 802 can be calculated by transform information acquired from the pose and position estimation algorithm described above. With the known size of card 802, the 3D position of four corners of card 802 can be calculated in camera coordinates.

These four 3D points can be transformed to projector coordinates using $T_p$. Then, with the projector's intrinsic distortion matrix, those four 3D points can be translated into screen coordinates. With the distortion parameters, the four 2D points are then corrected on screen coordinates.

Using the first card position recorded in calibration, 3D points can be transformed into desktop coordinates. Thus, it is possible to compute the 3D position and rotation based on desktop coordinates.

Exemplary Scenarios

The discussion above discloses techniques to obtain a 3D model of a real object and to display and observe 3D information about the object. The following are several exemplary application scenarios.

Figure 11:
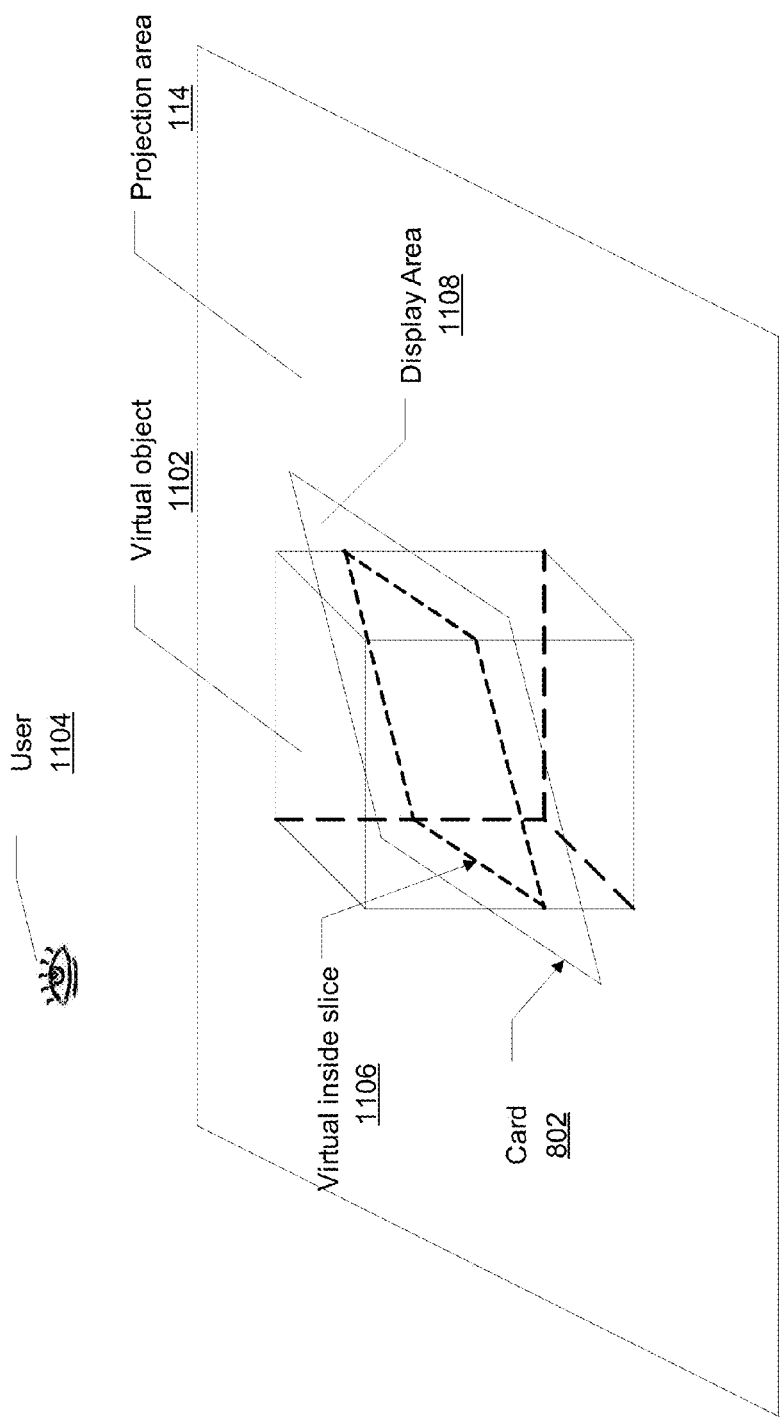
FIG. 11 illustrates an exemplary slicing of a virtual object on projection area.

FIG. 11 illustrates how the system described above can be used to display a virtual slice of a virtual object. A virtual object 1102 can be assumed to be resting within projection area 114. Virtual object 1102 can also be a 2D anamorphic image of object 120 projected by projector 102, not shown in FIG. 12, on projection area 114. The anamorphic image creates a 3D effect from the perspective of a user 1104 relative to projection area 114. Virtual object 1102 can also be a 3D image representing object 120 projected by projector 102 on projection area 114.

The user uses an observer such as card 802 to view a virtual inner slice 1106 of virtual object 1102. When the user changes the angle and position of card 802, the projector projects a different image on display area 1108 of card 802. The card image includes view of object 1102 from the perspective of card 802. The card image can be either an image of a portion of object 1102 above virtual inner slice 1106 or an image of internal cross section of object 1102 made by virtual inner slice 1106.

Figure 12:
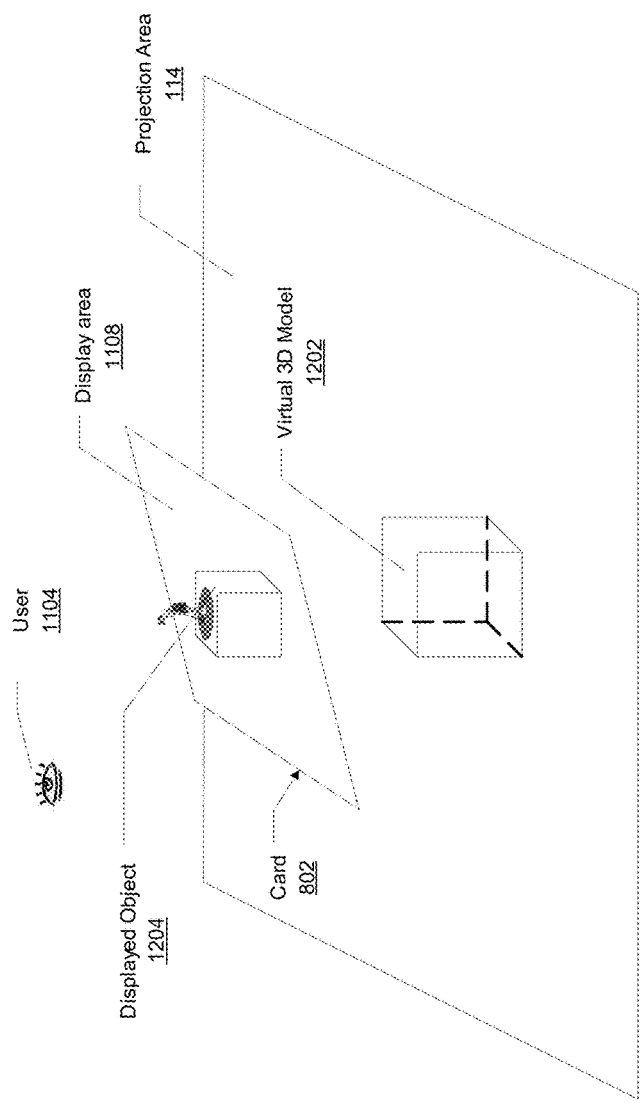
FIG. 12 illustrates an exemplary using card as a virtual camera to display virtual environment.

FIG. 12 illustrates an exemplary use of the card as a virtual camera to display a virtual environment. A real object is a building or fixture that exists in the real world. User 1104 uses card 802 as a virtual camera to observe the real object. The position and orientation of card 802 are used to define the virtual camera's position and orientation.

For example, real object is represented by a name or location on a map placed or projected onto projection area 114. Camera 104 captures an image of the name or location on the map. Controller 108 receives or retrieves a virtual 3D model 1202 of the building and/or internal multiple layer information of the building from a database. The database is either locally or remotely stored.

Controller 108 can project a virtual 3D model 1202 on projection area 114 through projector 102 for user 1104. Controller 108 can also save project model 1202 without projecting and user 1104 has a virtual object in his/her imagination as shown in FIG. 11. Controller 108 can further retrieve 2D or 3D images or information of different floors of the building from the database and project a displayed object 1204 on display area 1108 corresponding to a user's change of pose or position of card 802.

For example, displayed object 1204 includes 2D or 3D information of a specific floor of the building as the real object. When user 1104 moves up or down 802, displayed object 1304 comprises different floor information corresponding to such move. When user 1104 users card 802 to slice virtual 3D model 1202, the displayed object is the floor information corresponding to the intersection of the card with the virtual 3D model.

Figure 13:
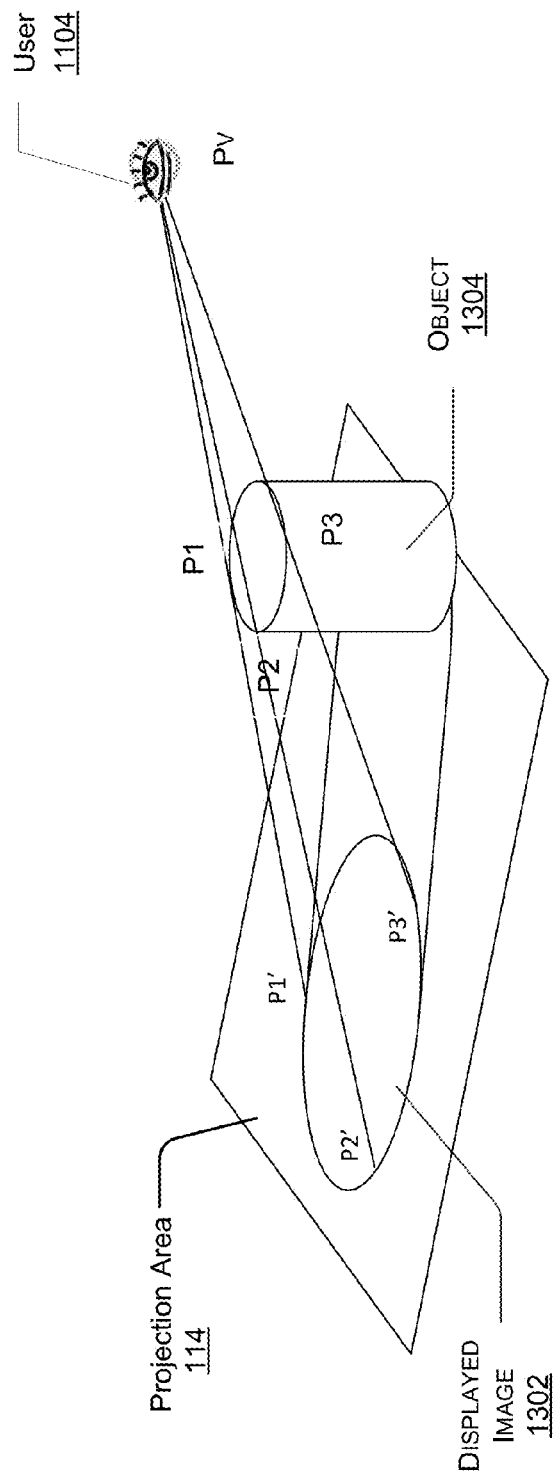
FIG. 13 illustrates an exemplary display of an anamorphic image with 3D effect.

FIG. 13 illustrates an exemplary display of an anamorphic image with 3D effect. An anamorphic image 1302 is displayed on projection area 114 by projector 102. When user 1104 look at projection area 114 from a certain view point relative to projection area 114, anamorphic image 1302 forms an illusion that a corresponding 3D object exists in the real environment.

As shown in FIG. 13, anamorphic image 1302 is formed as follows. It assumes that an object 1304 and view point of user 1104 are located as shown in FIG. 13. A virtual light path that crosses a view point Pv of user 1104 on object 1304 will establish a projection point P1' on projection area 114. The same procedures repeat for multiple virtual light paths across object 1304 until displayed image 1302 is formed.

Object 1304 can be a real object 1304 placed on projection area 114 or an imaged virtual object proportionally representing a real object such as a building.

Exemplary Working Environment

Figure 14:
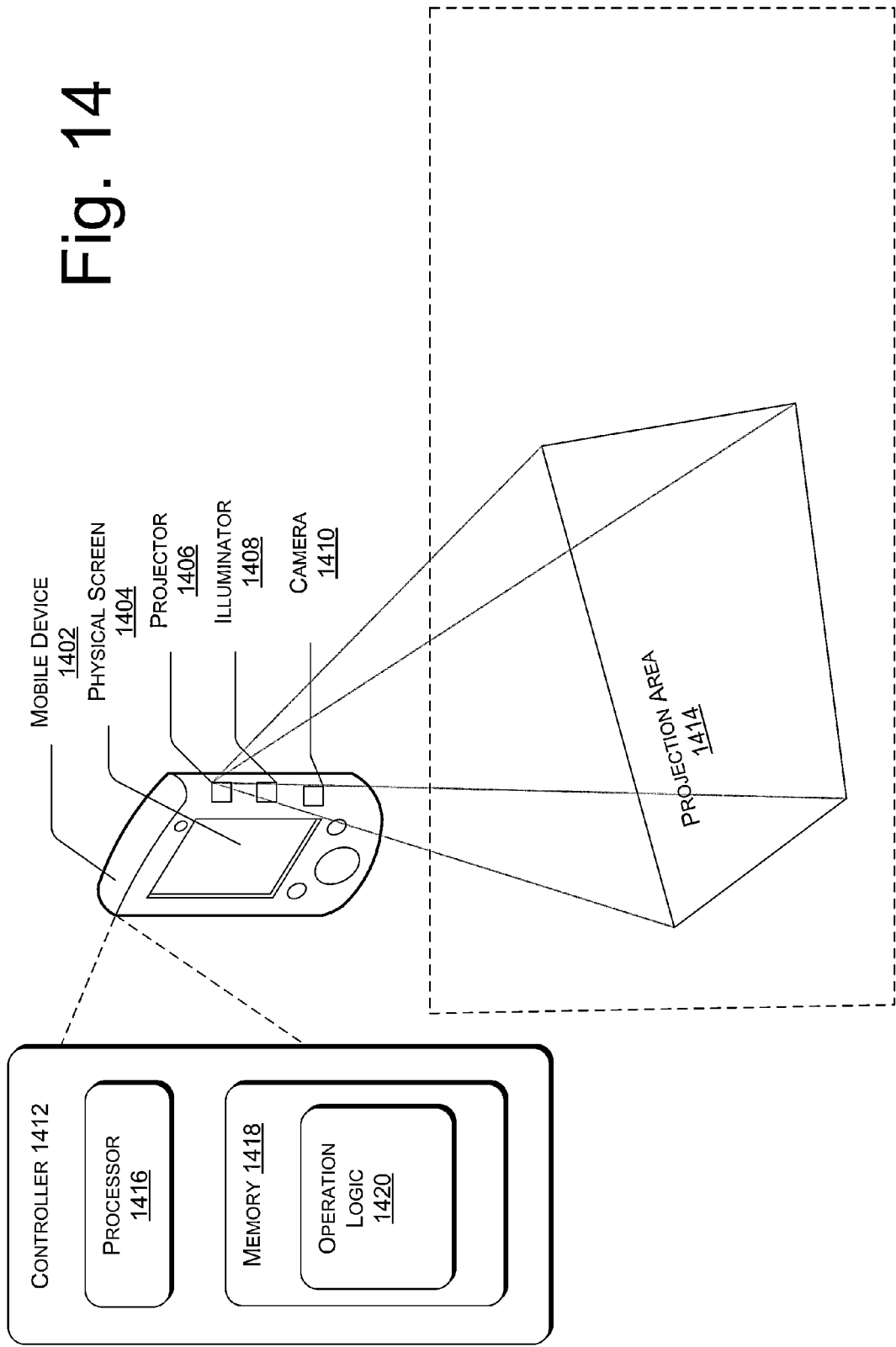
FIG. 14 illustrates an exemplary mobile device that integrates projector, illuminator and camera.

Projector 102, camera 104, illuminator 106, and controller 108 can be separate components as shown in FIG. 1, or integrated within a dock station or a mobile device as shown in FIG. 14. FIG. 14 illustrates an exemplary mobile device 1402 that integrates projector, illuminator and camera.

Generally, mobile device 1402 can be a mobile phone, a PDA, a mobile internet device, a netbook, a personal media player, a laptop, a hand-held mobile device, or any other portable, mobile computing device.

Mobile device 1402 can be equipped with a physical screen 1404, a projector 1406, an illuminator 1408, and one or more image or touch sensors such as a camera 1410, and a controller 1412.

Physical screen 1404 displays graphics to a user and can be used as part of a default or primary graphical user interface. Physical screen 1404 can be touch-sensitive to accept input from a user. Alternatively or additionally, keys or buttons (not shown) can be utilized for user input and interaction. The size of physical screen 1404 will often be quite small, limited by the small size of the mobile device 1402.

Projector 1406 can take many forms, including that of a so-called "pico" projector, which is small in size and has modest power requirements. Projector 1406 displays a user interface on a projection area or surface 1414 external to mobile device 1402. Projection area 1414 can be placed on a desktop or card 802 as shown in FIG. 8. The projected user interface occupies or defines a projection area 1414. The projected image in this embodiment can display a secondary graphical user interface with which the user can physically interact to control or interact with mobile device 1402. In many scenarios, the secondary user interface provided by projector 1406 will be much larger than the primary user interface formed by physical screen 1404.

Mobile device 1402 can use its physical screen 1404 and its external projection area 1414 in different ways. In one example, physical screen 1404 and projection area 1414 can show the same content. In another example, physical screen 1404 only shows simple content, such as a reminder or a clock. When the user wants a large display to perform more complex or detailed operations, such as reading a document, surfing the internet, or composing an email, the user can display a relevant application on projection area 1414 and interact with the application by pointing at or touching projection area 1414.

Illuminator 1408 and camera 1410 are used in combination to sense user interaction with the projected user interface. For example, illuminator 1408 can be an infrared emitter that illuminates projection area 1414 with infrared light.

Camera 1410 can be an infrared camera, sensitive to infrared light. Camera 1410 monitors the infrared illumination of projection area 1414 to detect touch interaction by a user with the displayed user interface.

There can be many different embodiments of mobile device 1402. In one embodiment, projector 1406, illuminator 1408, and camera 1410 are built into the mobile device 1402, as shown in the FIG. 14. One or more of projector 1406, illuminator 1408, and camera 1410 can also be integrated with each other. For example, illuminator 1408 and camera 1410 can be integrated as a single unit or module within mobile device 1402.

In the example of FIG. 14, the secondary user interface displayed by projector 1406 acts as a touch-sensitive display; the input sensor comprising illuminator 1408 and camera 1410 is able to detect when and where a user touches projection area 1414. In the illustrated example, camera 1410 senses the infrared illumination from illuminator 1408. User interactions relative to projection area 1414 cause shadows in the IR illumination, which mobile device 1402 interprets to determine placement of fingers or styli. In other embodiments, camera 1410) may be sensitive to visible or projected light to optically capture the user's interactions within the projection area 1414.

Controller 1412 shows internal or logical components of mobile device 1402. These components include one or more processors 1416, and memory 1418. Generally, memory 1418 contains computer-readable instructions including operation logic 1420 that are accessible and executable by processor 1416.

Operation logic 1420 includes at least following exemplary operation logic.

Figure 15:
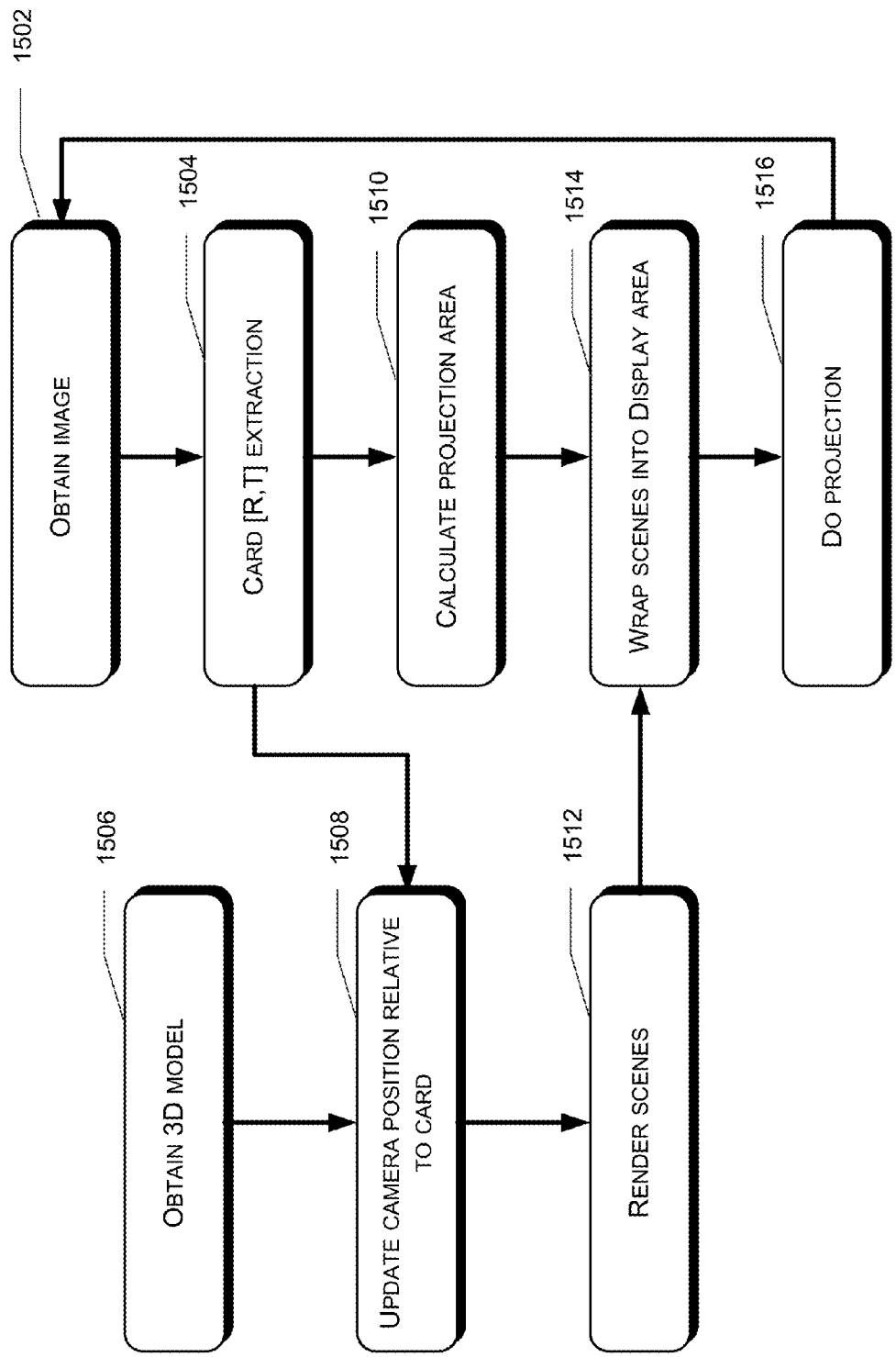
FIG. 15 illustrates an exemplary overall processing of image projection on a hand-held card.

FIG. 15 illustrates an exemplary overall processing of image projection on a hand-held card, such as a retro-reflector card.

An action 1502 comprises obtaining an image including a card held by the user.

An action 1504 comprises extracting a shape of the card. Card (R, T) represents a rotation and translation of card relative to camera.

An action 1506 comprises obtaining a 3D model of a real object.

An action 1508 comprises updating camera position relative to the card based on results of action 1504 and action 1506.

An action 1510 comprises calculating a display area on the card to display image.

An action 1512 comprises rendering scenes to be projected on display area of card.

An action 1514 comprises wrapping scenes to be projected onto display area of the card based on results of action 1510 and 1512.

An action 1516 comprises projecting wrapped scenes onto display area of the card.

Figure 16:
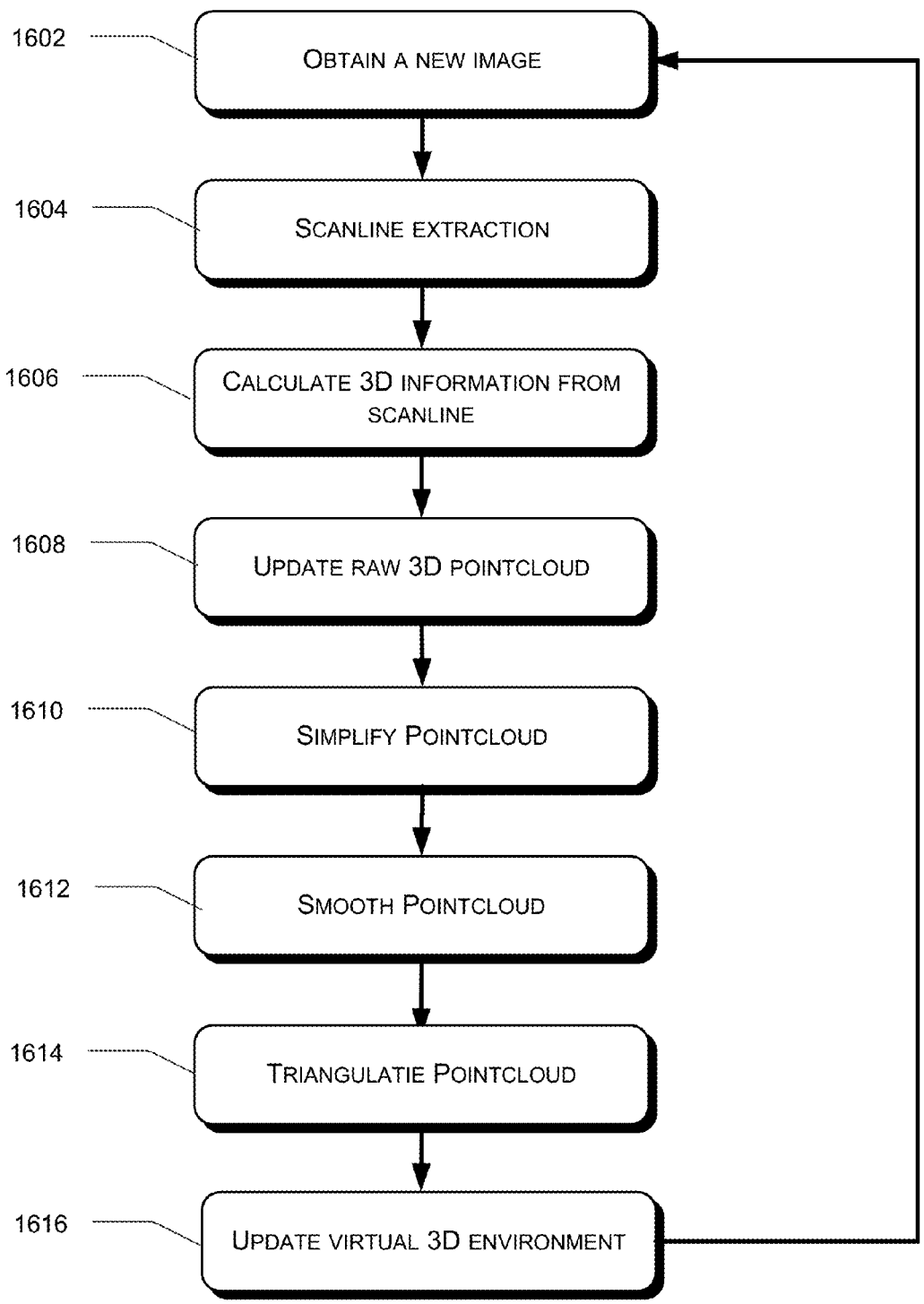
FIG. 16 illustrates an exemplary flowchart of 3D scanning of an object.

FIG. 16 illustrates an exemplary flowchart of 3D scanning of an object.

An action 1602 comprises obtaining a new image of an object, corresponding to a single raster line scan of projector 1406.

An action 1604 comprises extracting an individual raster line from the image taken by camera 1410.

An action 1606 comprises calculating 3D information of the object from the extracted raster lines. The 3D information includes 3D coordinates of the object.

An action 1608 comprises updating a raw image of 3D model of the object. The raw image comprises pointclouds depicting the object. The pointclouds refer to a bunch of dots depicting the object and the dots are captured by camera 1410 an identified by controller 1412.

An action 1610 comprises simplifying pointclouds depicting the object.

An action 1612 comprises smoothing boundaries of image of the object. There are many conventional algorithms that can be used for action 1610 and action 1612.

An action 1614 comprises pointcloud triangulation. The original 3D data generated by the scanner are pure points. To show the 3D effect, a surface is generated based on these points, by connecting neighboring points together to form triangles.

An action 1616 comprises updating a virtual 3D environment or model of the object. Such actions are repeated until the completion that projector 1406 finishes scanning the object and camera 1410 captures all raster lines of the scanned object.

Figure 17:
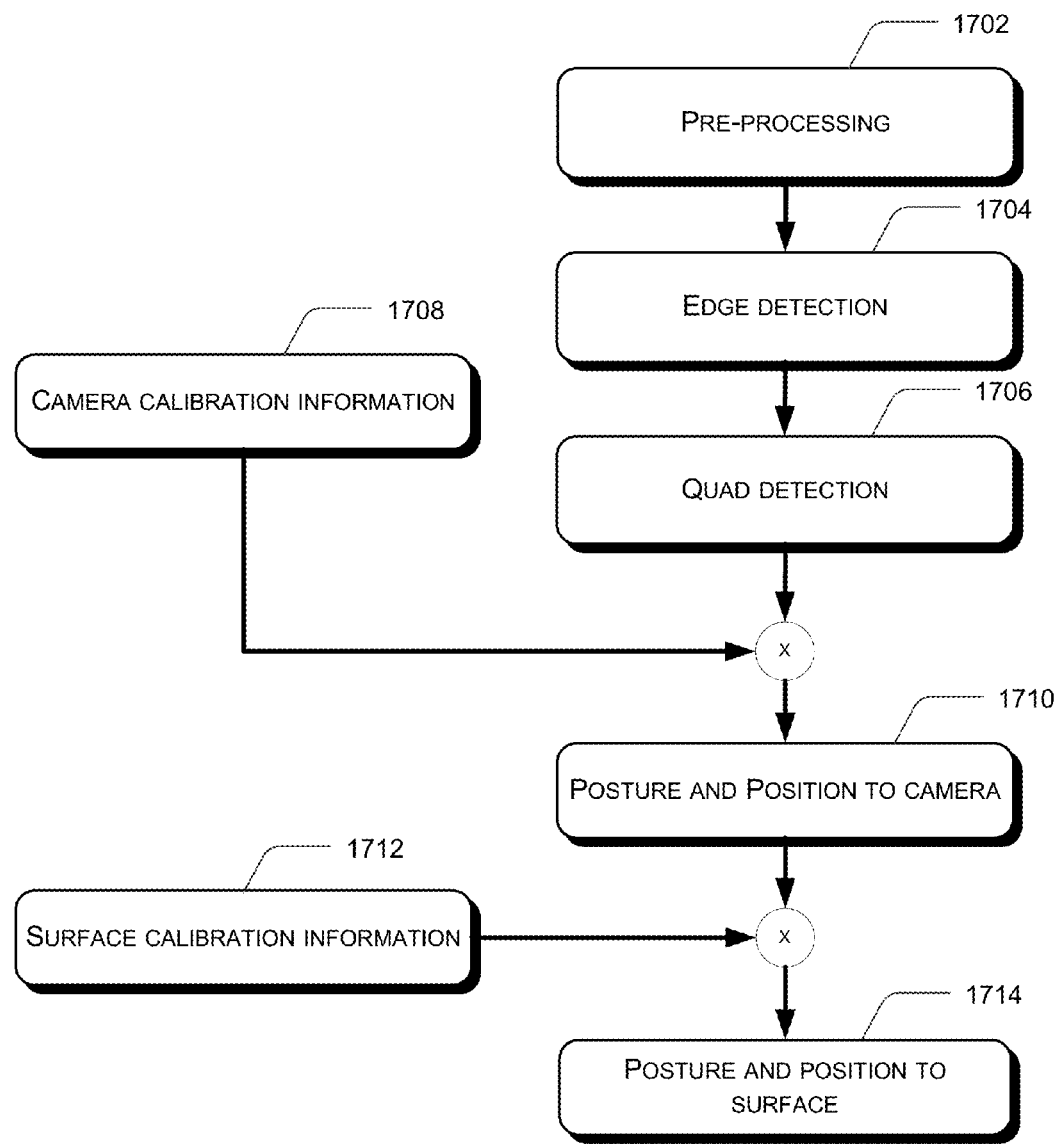
FIG. 17 illustrates an exemplary flowchart of extracting a position of a rectangular hand-held card.

FIG. 17 illustrates an exemplary flowchart of extracting a position of a rectangular hand-held card.

An action 1702 comprises pre-processing a captured image including the card, such as reducing random noise of the image.

An action 1704 comprises detecting edges of the card in the image.

An action 1706 comprises detecting quad vertexes of the card that form a rectangle most closely resembling the shape of the card.

An action 1708 comprises obtaining camera calibration information to determine a relative position of camera 1410 to the card. The exemplary procedures are described above.

An action 1710 comprises calculating posture and position of card relative to camera 1410 based on results of action 1706 and action 1708.

An action 1712 comprises obtaining surface calibration information to determine a relative position of camera 1410 to projection area or surface 1414.

An action 1714 comprises obtaining posture and position of card to projection area or surface 1414 based on results action 1710 and action 1712.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A device comprising:
an optical projector configured to project a visible image from a first perspective toward a projection area, the visible image being projected as a scanned sequence of raster lines;
an illuminator configured to illuminate the projection area with non-visible light;
one or more cameras configured to capture images of at least a portion of the projection area from a second perspective other than the first perspective; and
operating logic configured to perform actions comprising:
capturing raster line images of individual raster lines as they are projected by the optical projector;
evaluating distortion of the individual raster line of each raster line image;
capturing area images of the non-visible illumination of the projection area; and
analyzing the captured area images to determine physical user interaction with the projected visible image.

2. A device as recited by claim 1, wherein:
the visible image projected by the optical projector comprises visible and non-visible light.

3. A device as recited by claim 1, the actions further comprising:
calculating contour lines based on the distortion of the individual raster lines of the raster line images.

4. A device as recited by claim 1, wherein the illuminator is positioned concentrically with at least one of the one or more cameras to illuminate the projection area with non-visible light.

5. A device as recited by claim 1,
the actions further comprising:
analyzing at least one area image to detect placement of a user-held card within the projection area; and
projecting a visible sub-image from the projector onto the user-held card at its detected placement within the projection area.

6. A device as recited by claim 5, further comprising:
varying the sub-image to correspond to movement of the user-held card relative to the projection area.

7. A device as recited by claim 1, the actions further comprising:
continuously detecting placement of a user-held card within the projection area;
projecting a card image on the card, the card image including an object from the perspective of the card.

8. A device as recited by claim 1, the actions further comprising:
projecting an anamorphic image of an object on the projection area, the anamorphic image creating a 3-D effect from the perspective of a human viewer relative to the projection area.

9. A device comprising:
an optical projector configured to project a visible image from a first perspective toward a projection area, the visible image being projected as a scanned sequence of raster lines;
one or more cameras configured to capture images of at least a portion of the projection area from a second perspective other than the first perspective; and
operating logic configured to perform actions comprising:
capturing raster line images of individual raster lines as they are projected by the optical projector;
evaluating distortion of the individual raster line of each raster line image;
continuously detecting placement of a user-held card within the projection area; and
projecting a card image on the user-held card, the card image including an image of an object from the perspective of the card.

10. A device as recited by claim 9, wherein capturing raster line images of individual raster lines as they are projected by the optical projector comprises synchronizing the optical projector and at least one of the one or more cameras by providing at least one horizontal synchronization signal indicating a start and end of each raster line.

11. A device as recited by claim 10, wherein synchronizing the optical project and the at least one of the one or more cameras further comprises providing at least one vertical synchronization signal indicating a start and end of a frame.

12. A device as recited by claim 9, wherein the actions further comprise varying card image to correspond to movement of the user-held card relative to the projection area.

13. A device as recited by claim 9, wherein the card image comprises an image of an inner slice of the object.

14. A device as recited by claim 9, wherein the object comprises a real object that exists in the real world.

15. A device as recited by claim 9, wherein the visible image comprises an anamorphic image of the object, the anamorphic image creating a 3-D effect from the perspective of a human viewer relative to the projection area.

16. A device comprising:
an optical projector configured to project a visible image from a first perspective toward a projection area;
an illuminator configured to illuminate the projection area with non-visible light;
one or more cameras configured to capture images of at least a portion of the projection area; and
operating logic configured to perform actions comprising:
detecting placement of a user-held card within the projection area; and
projecting a card image on the user-held card, the card image including an image of an object from the perspective of the user-held card.

17. A device as recited by claim 16, wherein the actions further comprise:
detecting a new location of the user-held card within the projection area; and
projecting a new card image on the user-held card based on the new location.

18. A device as recited by claim 16, wherein the card image comprises an image of an inner slice of the object.

19. A device as recited by claim 16, wherein the object comprises a real object that exists in the real world.

20. A device as recited by claim 16, wherein the visible image comprises an anamorphic image of the object, the anamorphic image creating a 3-D effect from the perspective of a human viewer relative to the projection area.

* * * * *